Oct. 18, 1966  G. L. KUHL  3,279,800
BEATER ASSEMBLY FOR A MANURE SPREADER
Filed May 12, 1964  2 Sheets-Sheet 1
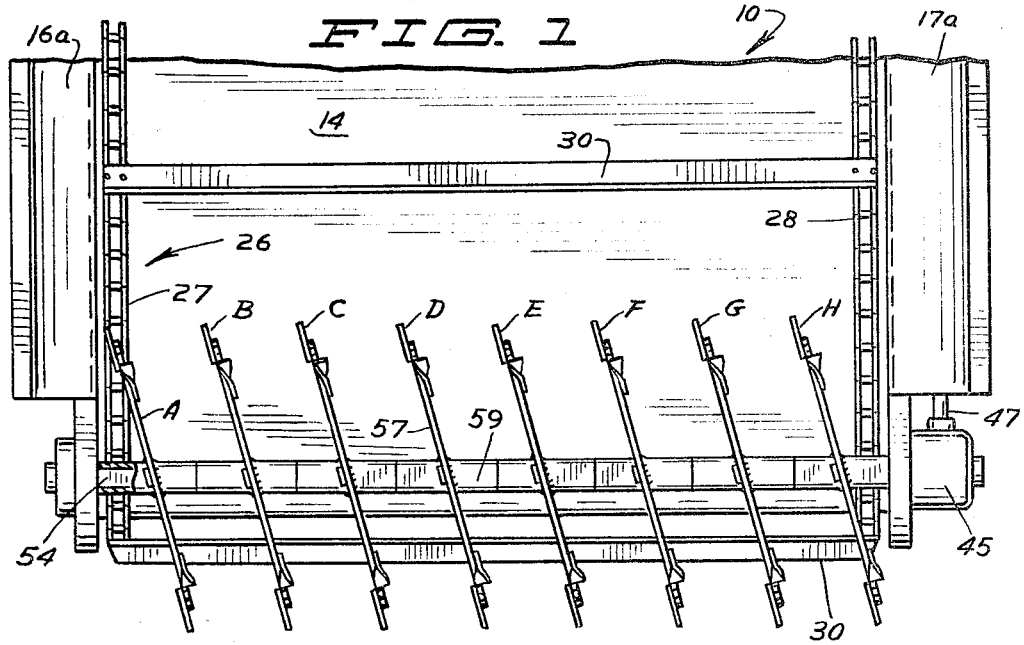
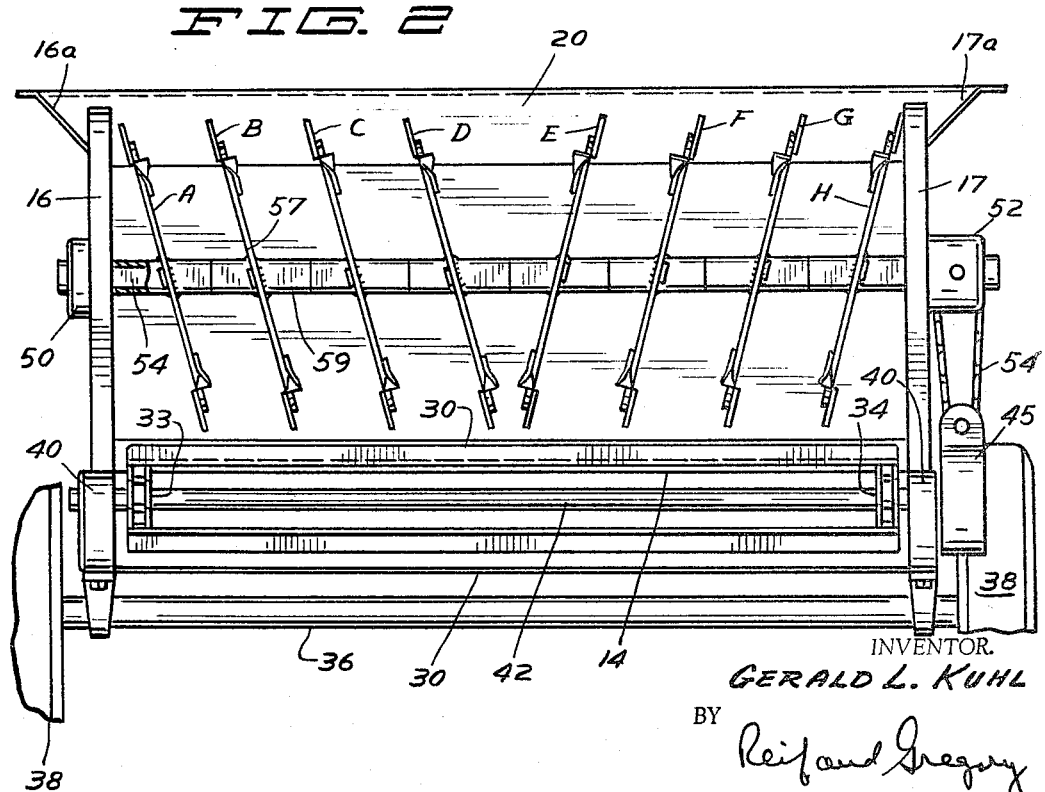
INVENTOR.
GERALD L. KUHL

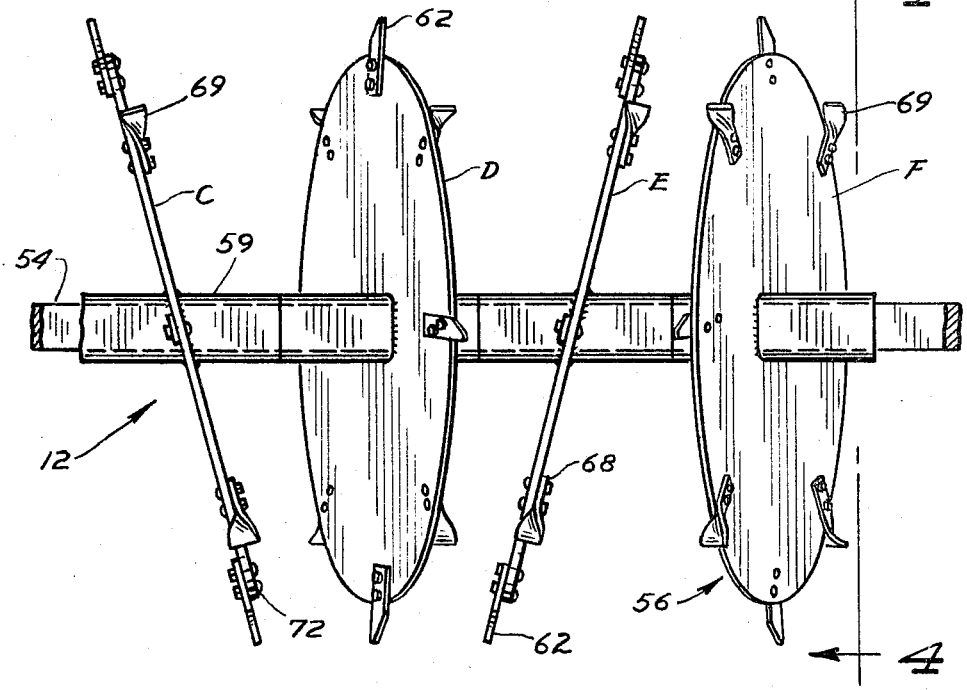
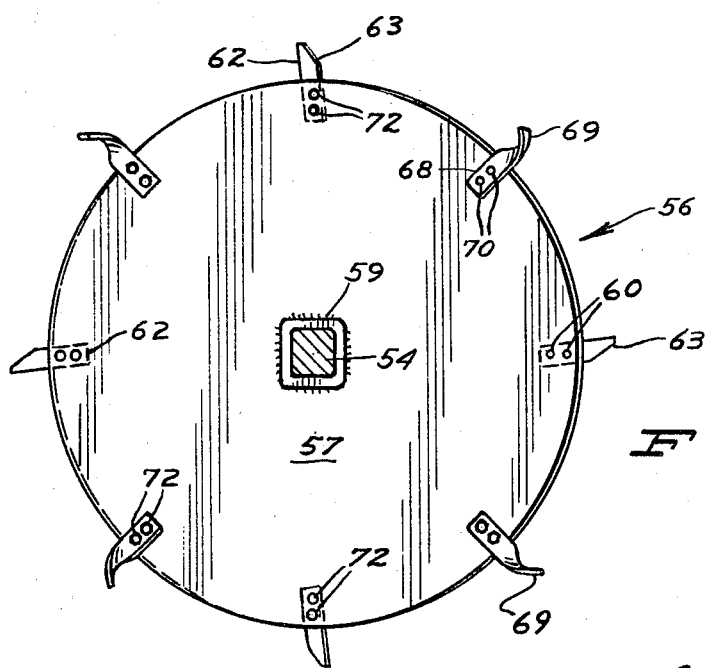
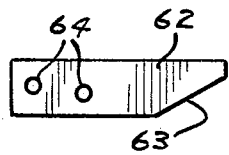

United States Patent Office 3,279,800
Patented Oct. 18, 1966

3,279,800
BEATER ASSEMBLY FOR A MANURE SPREADER
Gerald L. Kuhl, Chester, Minn.
Filed May 12, 1964, Ser. No. 366,861
1 Claim. (Cl. 275—6)

This invention relates to improvement in the beater assembly for a manure spreader to provide more efficient disintegration of material and a more uniform and widespread distribution of material.

It is an object of this invention to provide a beater assembly comprising beater blade elements arranged and constructed to be disposed in overlapping planes relative to one another to result in more complete tearing and shredding of material and in the even and more widespread distribution thereof.

It is another object of this invention to provide a beater assembly comprising a plurality of beater elements removably assembled on a driving element.

It is also an object of this invention to provide removable and interchangeable elements for a beater assembly, said elements being arranged and constructed to be variably positioned circumferentially relative to one another whereby planes in which said elements are respectively disposed are variably angled relative to one another.

More specifically it is an object of this invention to provide a beater assembly comprising a driving shaft, a plurality of beater elements removably mounted on said shaft whereby the number of elements on said shaft may be varied in accordance with the width of the vehicle body of a spreader and said beater elements may be interchangeably positioned relative to one another.

These and other objects and advantages of the invention will be fully set forth in the following description made in connection with the accompanying drawings in which like reference characters refer to similar parts throughout the several views and in which:

FIG. 1 is a broken top plan view showing the invention herein;

FIG. 2 is a view similar to FIG. 1 in end elevation showing portions thereof differently positioned;

FIG. 3 is a fragmentary view in elevation of a detail of the invention showing alternate positioning of portions thereof on an enlarged scale;

FIG. 4 is a view in vertical section taken on line 4—4 of FIG. 3 as indicated; and FIG. 5 is a detail of the invention in elevation on an enlarged scale.

Referring to the drawings and particularly to FIGS. 1 and 3, the reference character 10 indicates a manure spreader body generally of which only sufficient structure is shown to support the beater assembly 12 described hereinafter.

Said manure spreader body is of conventional construction. Shown is a floor 14 with opposite side walls 16 and 17 having upper outwardly angled side wall portions 16a and 17a respectively.

Movable longitudinally about the floor is an endless conveyor 26 comprising chain members 27 and 28 having longitudinally spaced flight members 30 extending therebetween. Said chain members are shown riding over driving sprockets 33 and 34. Said chains will ride over corresponding idler sprockets at the front end portion of said body not here shown. Said body may be of a two or four wheel type. Indicated here is a two wheel type of body adapted to be supported and drawn by a tractor.

A rear axle 36 is shown mounted in a conventional manner having free running wheels 38 at either end thereof suporting said body 10. Bearing boxes 40 are mounted at either rear end of the side walls 16 and 17 having journaled therein a shaft 42 which carries thereon for driving engagement therewith the sprockets 33 and 34.

Mounted at the rear outer side of the side wall 17 is a gear box 45 receiving therein in driving engagement the adjacent end portion of the shaft 42. Said end portion of said shaft will be appropriately equipped with a suitable gear to cooperate with the gear assembly within said gear box. Said gear assembly within said gear box 45 will be driven in the present embodiment by a connecting rod 47 which in a conventional manner will run to the power takeoff of a tractor to be driven thereby. The gear assembly within said box 45 will be of conventional design and a description thereof is not deemed necessary.

Mounted on the wall 16 is a bearing box 50, and in axial alignment therewith mounted on the outer side of the wall 17 is a gear box 52. Having its end portions respectively journaled in said bearing box and engaged to be driven in said gear box is a shaft 54. Said shaft will be removably mounted in a conventional manner, the specific construction of which does not form a part of the invention herein and the appropriate specific structure of which is well known in the art. The gear box 52 is connected to the gear box 45 by a sprocket chain 54 which will engage appropriate gearing in said respective boxes. The detail of the gear trains is well known in the art and is not believed to require any explanation or further illustration. Thus in the present embodiment the shafts 54 and 42 are driven simultaneously.

Mounted on said shaft 54 are a plurality of beater blades 56 which taken together with said shaft comprise the beater assembly 12. The beater assembly is shown variously positioned in FIGS. 1–3 but the beater blades are of identical construction. Only one beater blade will be described as to structure. For the purpose of distinguishing between specific blades in describing the operation thereof as will be set forth hereinafter, said blades are also individually indicated by the characters A through H.

In the present embodiment a beater blade 56 is shown formed of plate member 57 in the form of a disk of suitable material. Experience has indicated that disk members having a diameter on the order of 18 inches are very satisfactory as to size. Said disk member 57 in a conventional manner is mounted on hub portion 59 to be integral therewith as by welding. Said hub portion is very suitable formed of a length of six inches. Standard sized bodies of manure spreaders run on the order of four or five feet in width, whereas either eight or ten hub portions will span the width of the body of a manure spreader.

Said disk member 57 is positioned to be disposed in a plane at such angle to the axis of said hub portion 59 that diametrically opposed peripheral portions of adjacent disk members will overlap one another. The degree of the angular relationship between a disk member and the axis of its hub portion will determine the extent of this overlapping relation. It is sufficient that there be an overlapping relationship.

Referring to the shaft 54, it is here shown to be square in cross section. Said shaft may be polygonal in cross section and have on the order of six or eight sides for a purpose which will be hereinafter described.

A plurality of tooth members are shown spaced about the plate member 57. In the present embodiment these members are shown to be of two kinds. One kind comprises cutting teeth 62 and the other comprises spreading teeth 68.

Said cutting teeth 62 are shown formed of appropriate flat bar stock having a beveled leading or cutting edge 63 and having a pair of offset apertures 64 through which when put in register with a pair of the radially alined apertures 60 formed in the disk member 57 adjacent the periphery thereof will position said cutting teeth to be in an offset position relative to the radius of said plate number 57.

The spreading teeth 68 are formed of flat bar stock having squared free end portions 69 which are twisted on the order of ninety degrees to be at an angle normal to the plane of said disk member 57 and to in effect form a scoop. Said tooth members 68 have apertures 70 therein which when put in register with the apertures 60 will position said members 68 to be radial of said disk member 57. Said teeth 62 and 68 will be suitably secured by nutted bolts 72.

OPERATION

With reference to the arrangement of the beater blades 57 as illustrated in FIG. 1, said blades are shown to be in a parallel arrangement. Opposed peripheral portions of adjacent beater blades have an overlapping relationship. As the blades rotate, it will be understood that each blade continuously cuts through an area having a width defined by parallel planes passing through diametrically opposed peripheral points of a blade at right angles to the axis of said shaft 54. Thus the areas through which each of the blades pass in rotating overlap one another. Hence there is complete coverage by the blades in digging into the material in the manure spreader the full width thereof and except at the remote sides of the end blades there is overlapping coverage.

The parallel relationship if the individual blades in rotating provides an action whereby the material spread is distributed from side to side in a reciprocating motion which gives unusually good ground coverage.

The tooth members 63 dig into and tear, shred or cut the material in the spreader and the tooth members 68 with flat scoop-like free end portions 69 very efficiently distribute and spread out the material.

The arrangement of the blades relative to one another may be varied very easily as may be desired. With reference to FIG. 2, the blades E–H and their respective hub portions have been moved 180 degrees about the axis of the shaft 54, or in other words, have been respectively inverted. Hence the group of blades A–D relative to the group of blades E–H now have a diverging relationship.

Each group of blades develops a reciprocating action in the material distributed, with the two distinct bodies of material thus fed out having a tendancy to commingle for a substantial concentration of material. This provides a different distributing pattern from the arrangement of blades, as illustrated in FIG. 1.

A further arrangement of beater blades is illustrated in FIG. 3. Here the blades C–F are shown on an enlarged scale to clearly illustrate specific individual differences in blade arrangement.

The blade D has been rotated 90 degrees about the axis of the shaft 54 relative to the blade C. This is compared to a like relationship between adjacent blades which would be a parallel relationship. The blade E has been rotated 180 degrees relative to the blade C. The blade F has been rotated 270 degrees relative to the blade C. Thus alternate blades have a diverging relationship as to one another, such as C and E. Further pairs of diverging blades, such as C–E and D–E are positioned circumferentially to be 90 degrees apart, relative to a like or parallel relationship.

It is seen that with a shaft polygonal in cross section that a variety of angular relationships may be developed between adjacent blades and between groups of blades to achieve a variety in the pattern of distribution of feed from the spreader body.

Thus it is seen that I have provided a simply constructed beater assembly capable of a wide variety of adjustment of beater blades.

Thus it is seen that I have provided a simply constructed beater assembly capable of a wide variety of beater blade adjustment for a wide variety of distribution pattern of material.

It will of course be understood that various changes may be made in the form, details, arrangement and proportions of the parts, without departing from the scope of applicant's invention which, generally stated, consists in an apparatus capable of carrying out the objects above set forth, in the parts and combinations of parts disclosed and defined in the appended claim.

What is claimed is:
A beater assembly having in combination:
    a shaft,
    means driving said shaft,
    a beater element mounted onto said shaft,
    said beater element comprising
        a hub portion,
        a disk member carried on said hub portion,
        a plurality of tooth members spaced about the periphery of said disk member and projecting substantially radially outwardly of the periphery thereof,
        means individual removably securing said tooth members to said disk members,
        said tooth members being formed of enlongated plate-like members,
        alternate of said tooth members having leading beveled cutting edges, and
        the projecting end portions of the remainder of said tooth members being twisted axially relative to themselves forming a scoop-like blade portion projecting substantially radially of said disk member in a plane normal to the plane of said disk member.

References Cited by the Examiner

UNITED STATES PATENTS

| | | | |
|---|---|---|---|
| 1,682,468 | 8/1928 | Barnes | 172—548 X |
| 1,963,500 | 6/1934 | Macalister | 275—2 X |
| 2,239,448 | 4/1941 | Selhorst | 275—3 |
| 2,240,720 | 5/1941 | Selhorst | 275—6 |
| 2,503,993 | 4/1950 | Blomgren | 275—6 UR |
| 2,403,993 | 7/1958 | Thompson | 275—6 X |

FOREIGN PATENTS 1,155,173   4/1958   France.

ABRAHAM G. STONE, *Primary Examiner.*

J. R. OAKS, *Assistant Examiner.*